(12) United States Patent
Hanson et al.

(10) Patent No.: US 9,588,226 B2
(45) Date of Patent: Mar. 7, 2017

(54) SYSTEM AND METHOD FOR PROVIDING POSITION CORRECTION DATA

(75) Inventors: Nigel Peter Hanson, Christchurch (NZ); James Neil Greenberg, Boulder, CO (US); Geoffrey Robert Kirk, Broomfield, CO (US)

(73) Assignee: Trimble Inc., Sunnyvale, CA (US)

( * ) Notice: Subject to any disclaimer, the term of this patent is extended or adjusted under 35 U.S.C. 154(b) by 839 days.

(21) Appl. No.: 12/343,105

(22) Filed: Dec. 23, 2008

(65) Prior Publication Data

US 2010/0159952 A1 Jun. 24, 2010

(51) Int. Cl.
| | |
|---|---|
| *G01S 19/07* | (2010.01) |
| *H04W 4/02* | (2009.01) |
| *H04W 4/20* | (2009.01) |
| *H04W 64/00* | (2009.01) |
| *H04L 29/08* | (2006.01) |

(52) U.S. Cl.
CPC .............. *G01S 19/07* (2013.01); *H04L 67/02* (2013.01); *H04L 67/18* (2013.01); *H04W 4/02* (2013.01); *H04W 4/20* (2013.01); *H04W 64/00* (2013.01)

(58) Field of Classification Search
CPC ....... H04W 64/00; H04W 4/02; H04W 4/023; H04W 4/22; H04W 64/003; H04W 24/00; H04W 4/025; G01S 5/0252; G01S 5/0236; G01S 5/0242; G01S 5/021; G01S 13/765; G01S 19/03; G01S 19/05; G01S 19/25; G01S 19/07; G01C 21/20; G01C 15/00
USPC ... 455/404.2, 407, 408, 456.1, 456.2, 456.5, 455/456.6; 342/357.23–357.39, 357.4, 342/357.41–357.49, 357.62; 701/468–471, 473–478, 518
See application file for complete search history.

(56) References Cited

U.S. PATENT DOCUMENTS

| | | | | |
|---|---|---|---|---|
| 5,796,365 | A  * | 8/1998 | Lewis ....................... | 342/357.25 |
| 6,229,478 | B1 * | 5/2001 | Biacs et al. .............. | 342/357.42 |
| 6,429,811 | B1 * | 8/2002 | Zhao et al. .............. | 342/357.66 |
| 6,615,131 | B1 * | 9/2003 | Rennard et al. ............. | 701/420 |
| 6,704,652 | B2 * | 3/2004 | Yi .................................. | 701/470 |
| 6,795,799 | B2 * | 9/2004 | Deb et al. ..................... | 702/188 |
| 6,862,526 | B2 * | 3/2005 | Robbins ........................ | 701/214 |
| 6,865,484 | B2 * | 3/2005 | Miyasaka et al. ............ | 701/470 |
| 6,985,104 | B2 * | 1/2006 | Large et al. ............. | 342/357.27 |
| 7,064,706 | B2 * | 6/2006 | King et al. .............. | 342/357.44 |
| 7,152,160 | B2 * | 12/2006 | Lantto et al. ................ | 713/168 |
| 7,468,693 | B1 * | 12/2008 | Bird ........................ | 342/357.41 |

(Continued)

OTHER PUBLICATIONS

Landau, Herbert et al., (Virtual Reference Station Systems, Journal of Global Positioning Systems, 2002, vol. 1, No. 2:137-143.*

*Primary Examiner* — Magdi Elhag
(74) *Attorney, Agent, or Firm* — Kilpatrick Townsend & Stockton LLP (57) ABSTRACT

System and method for providing position correction data over a data communications network. In one embodiment, a method includes receiving a request for a mobile device over a data communications network, wherein the request includes a user identification. The method may further include receiving geographic position of the mobile device, selecting a mountpoint based, at least in part, on one or more of the user identification and the geographic location of the mobile device, and transmitting the position correction data to the mobile device over the data communications network.

19 Claims, 7 Drawing Sheets

(56) References Cited

U.S. PATENT DOCUMENTS

| | | | |
|---|---|---|---|
| 7,480,511 B2* | 1/2009 | O'Meagher | 455/456.1 |
| 7,523,191 B1* | 4/2009 | Thomas et al. | 709/224 |
| 7,558,584 B2* | 7/2009 | Yamamoto et al. | 455/456.5 |
| 7,580,794 B2* | 8/2009 | Janky et al. | 701/486 |
| 2001/0019960 A1* | 9/2001 | Takayama et al. | 455/456 |
| 2003/0002464 A1* | 1/2003 | Rezaiifar et al. | 370/336 |
| 2003/0083817 A1* | 5/2003 | Yi | 701/215 |
| 2003/0154026 A1* | 8/2003 | Miyasaka et al. | 701/213 |
| 2005/0039050 A1* | 2/2005 | Morand et al. | 713/201 |
| 2005/0064878 A1* | 3/2005 | O'Meagher | 455/456.1 |
| 2006/0066479 A1* | 3/2006 | Large et al. | 342/357.09 |
| 2006/0158373 A1* | 7/2006 | Kamei | 342/357.03 |
| 2007/0082659 A1* | 4/2007 | Nevalainen | 455/418 |
| 2008/0177569 A1* | 7/2008 | Chen et al. | 705/2 |

* cited by examiner

SYSTEM AND METHOD FOR PROVIDING POSITION CORRECTION DATA

FIELD OF THE INVENTION

The present invention relates in general to positioning and more particularly to a system and method for providing position correction information by a network connection.

BACKGROUND

In recent years, use of global positioning data has increased for both commercial and public use. A number of sources can lead to errors with global positioning data. For many applications, received global positioning signals may be used to provide data of sufficient accuracy without a need for correction. However, for many applications, received global positioning signals may require correction. One solution is to provide correction data to a positioning device to improve positioning accuracy. Conventional methods of providing correction information typically employ radio systems. However, these radio systems may be limited by availability of frequencies, licensing issues and coverage issues. Further, such systems may not be operable in certain geographic reasons.

Networked Transport of RTCM via Internet Protocol (NTRIP) is a protocol for providing Global Navigation Satellite System (GNSS) data over a data communications network. NTRIP is a stateless protocol based on the Hypertext Transfer Protocol (HTTP) and may disseminate differential correction data. However, a disadvantage of an NTRIP system is that the system requires manual designation of mountpoints by a user. Further, use of conventional NTRIP systems is further complicated by requiring users to identify mountpoints by name, configure servers for operation with mountpoints, and provide identification information for mountpoints (e.g., passwords). As a result, users of the NTRIP system may be limited to receive correction data from known mountpoints. In addition, many users of positioning devices may find configuration of NTRIP cumbersome and difficult.

Many conventional devices do not allow for users to properly configure devices for correction data. Further, device and/or system limitations may restrict the use of received position correction data or may not be compatible with these various requirements. Accordingly, there is a need for a system and method for receiving position correction data over a network connection.

BRIEF SUMMARY OF THE INVENTION

Disclosed and claimed herein are a system and method for providing position correction data over a data communications network. In one embodiment the method includes receiving a request for a mobile device over a data communications network, the request including user identification. The method further includes receiving position data of the mobile device, selecting a mountpoint based, at least in part, on one or more of the user identification the position data of the mobile device, and transmitting the position correction data to the mobile device over the data communications network.

Other aspects, features, and techniques of the invention will be apparent to one skilled in the relevant art in view of the following detailed description of the invention.

DETAILED DESCRIPTION OF EXEMPLARY EMBODIMENTS

One aspect of the present invention is directed to providing position correction data. In one embodiment, a process may be provided for providing correction data over a data communications network to a mobile device, such as a surveying device, handheld device, rover, etc. The process may include automatically identifying one or more mountpoints which may be employed by the mobile device. Further, a data throttling process may be provided to activate and/or suspend transmission of position correction data for one or more mountpoints. Position correction information may be provided to increase accuracy of global positioning measurements by way of a data communications network.

According to another embodiment, a system is provided to provide position correction data to a mobile device over a data communications network. The system may include a server in communication with one or more mountpoints configured to provide correction data to the server. In one embodiment, correction data may be provided to the mobile device. In certain embodiments, the mountpoint may interoperate with a data communications network and/or global position data source to provide correction data to an mobile device. The server may be configured to calculate correction data based on data from one or more mountpoints. Alternatively, the server may be configured to forward data from one or more mountpoints to a mobile device. The system may further be configured to support mountpoints based on setup data provided by a mountpoint.

According to another aspect of the invention, a server may be configured to dynamically provide position correction data to one or more mobile devices. In one embodiment, a server may be configured to provide position correction data based on one or more attributes of a mobile device. Further, data from one or more mountpoints may be automatically provided to a mobile device. According to another embodiment, the system may be configured to control data transmitted from one or more mountpoints such that data throttling is provided. The server may further be configured to interoperate with a mountpoint and rover using a mountpoint serial number, predefined identifier, and password provided by the mountpoint for registration with the server. Correction data from the mountpoint may be provided to a mobile device based on at least one of the identifier and password.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, etc. The code segments may be downloaded via computer networks such as the Internet, Intranet, etc.

Figure 1:
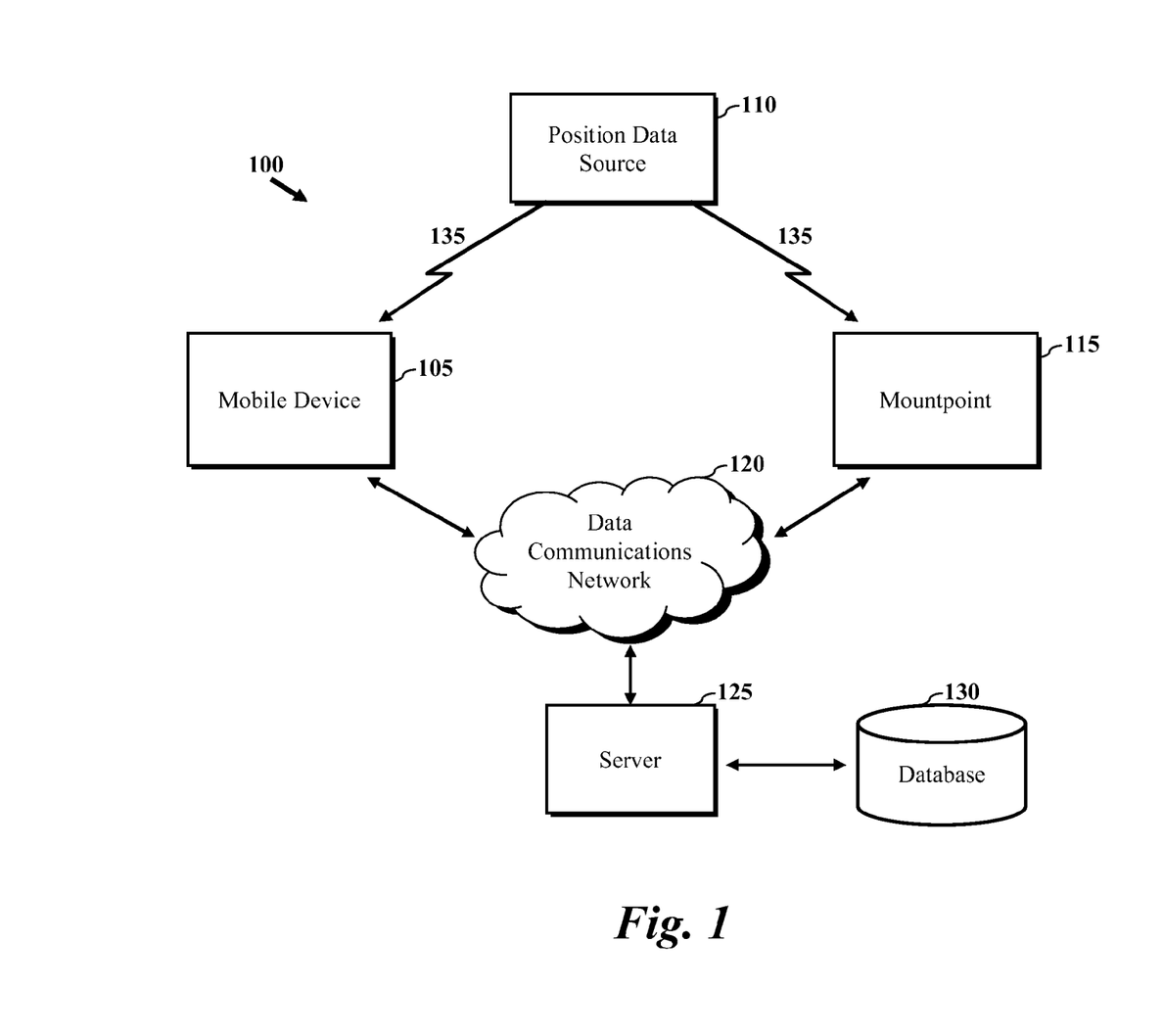
FIG. 1 depicts a simplified system diagram according to one embodiment of the invention.

Referring now to the drawings, FIG. 1 illustrates a simplified system diagram of a system for providing correction data according to one or more embodiments of the invention. As shown in FIG. 1, system 100 includes position data source 105 which may be configured to provide positioning data, such as global navigation satellite system (GNSS) data, global positioning system (GPS) data and geo-spatial positioning data in general. Position data source 105 may correspond to one or more sources including satellites to provide positioning data.

As shown, system 100 further includes mobile device 105 and mountpoint 115. As used herein, "mountpoint" relates to a base station or transmitter at a known location which can provide position correction data. Mobile device 105 and mountpoint 115 may be configured to receive global positioning data, shown as 135, from a position data source 110. The global positioning data may be utilized to determine a position of mobile device 105. Mountpoint 115 may be configured to provide correction data based on global positioning data 135. In one embodiment, mountpoint 115 may correspond with a known location such that correction data may be determined based on the known position of mountpoint 115 and received global positioning data 135. Mobile device 105 and mountpoint 115 may each be coupled to data communications network 120 for communication with server 125. According to another embodiment, mobile device 105 and mountpoint 115 may each be coupled to data communications network 120 by a wireless link such as wireless Internet access through Mobile IP Networks like Global System for Mobile-communications (GSM), General Packet Radio Service (GPRS), Enhanced Data rates for Global Evolution (EDGE), or Universal Mobile Telecommunications System (UMTS).

In one embodiment, position correction data determined by mountpoint 115 may be transmitted via data communications network 120 to server 125. According to another embodiment, data determined by mountpoint 115 may be utilized by server 125 and/or an external processor (not shown) for determining position correction data. Position correction data may be determined base on a type of position data (e.g., GPS, GNSS, etc.).

Mobile device 105 may relate to one or more of a mobile machine, surveying tool, rover, and device in general. According to one embodiment, mobile device 105 may include communication components to receive global position data. Mobile device 105 may includes one or more components to communicate with a data communications network as will be discussed in more detail with reference to FIG. 2.

Continuing to refer to system 100 of FIG. 1, server 125 may be coupled to database 130 for storage and retrieval of positioning information and account information of one or more users. In one embodiment, server 125 may be configured to provide position correction information using a communication network interface such as a webpage, data stream, etc. Server 125 may require registration and/or authentication by users. Authentication by server 125 may be based on an identifier, name and/or password provided by mountpoint 115.

Figure 2:
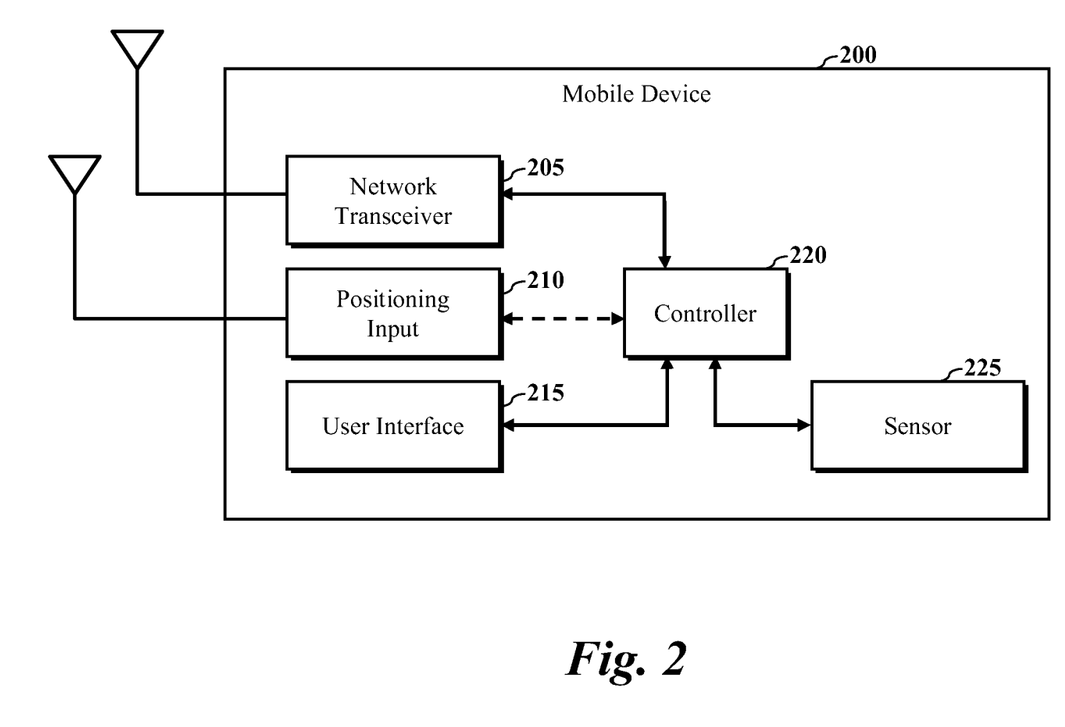
FIG. 2 depicts a simplified block diagram of a rover according to one embodiment of the invention.

Referring now to FIG. 2, a simplified block diagram is shown of the mobile device of FIG. 1 according to another embodiment. As shown in FIG. 2, mobile device 200 (e.g., mobile device 105) includes controller 220 coupled to network transceiver 205, positioning input 210, user interface 215 and sensor 225.

In one embodiment, mobile device 200 may be configured to receive position data via positioning input 210. Positioning input 210 may be coupled to a positioning receiver providing positioning data corresponding to one or more of global navigation satellite system (GNSS) data, global positioning system (GPS) data and geo-spatial positioning data in general. In one embodiment, user interface 215 of mobile device 200 may be utilized to perform surveying functions, as a data communications interface and operation of the mobile device. According to another embodiment, mobile device 200 may include sensor 220 to detect one or more measurements including surveying characteristics and measurements in general. Data associated with measurements of 220 may be associated with positioning data determined by positioning input.

User interface 215 may be configured to provide guidance information to an operator of mobile device 200 (e.g., mobile device 110). Controller 220 can be any type of processor such as a microprocessor, field programmable gate array (FPGA) and/or application specific integrated circuit (ASIC). It may also be appreciated that data received by controller 220 may be stored in memory (not shown). Memory of controller 220 can be one of a ROM and RAM memory. It may also be appreciated that memory of controller 220 may be configured to store user records for survey data, travel data, mobile device characteristics, and/or field data.

In certain embodiments, controller 220 may be configured to correct one or more measurements of sensor 225 based on received correction data. In one embodiment, mobile device 200 may be a stand alone device which may be configurable for a plurality of machines. It may also be appreciated that mobile device 200 may be integrated with a one or more components of a machine. To that end, mobile device 200 can be configurable with one or more machines.

Mobile device 200 may be coupled to data communications network 120 by network transceiver 205 for wireless Internet access through Mobile IP Networks like Global System for Mobile-communications (GSM), General Packet Radio Service (GPRS), Enhanced Data rates for Global Evolution (EDGE), or Universal Mobile Telecommunications System (UMTS). Further, correction data for mobile device 200 may be received by network transceiver 205.

Figure 3:
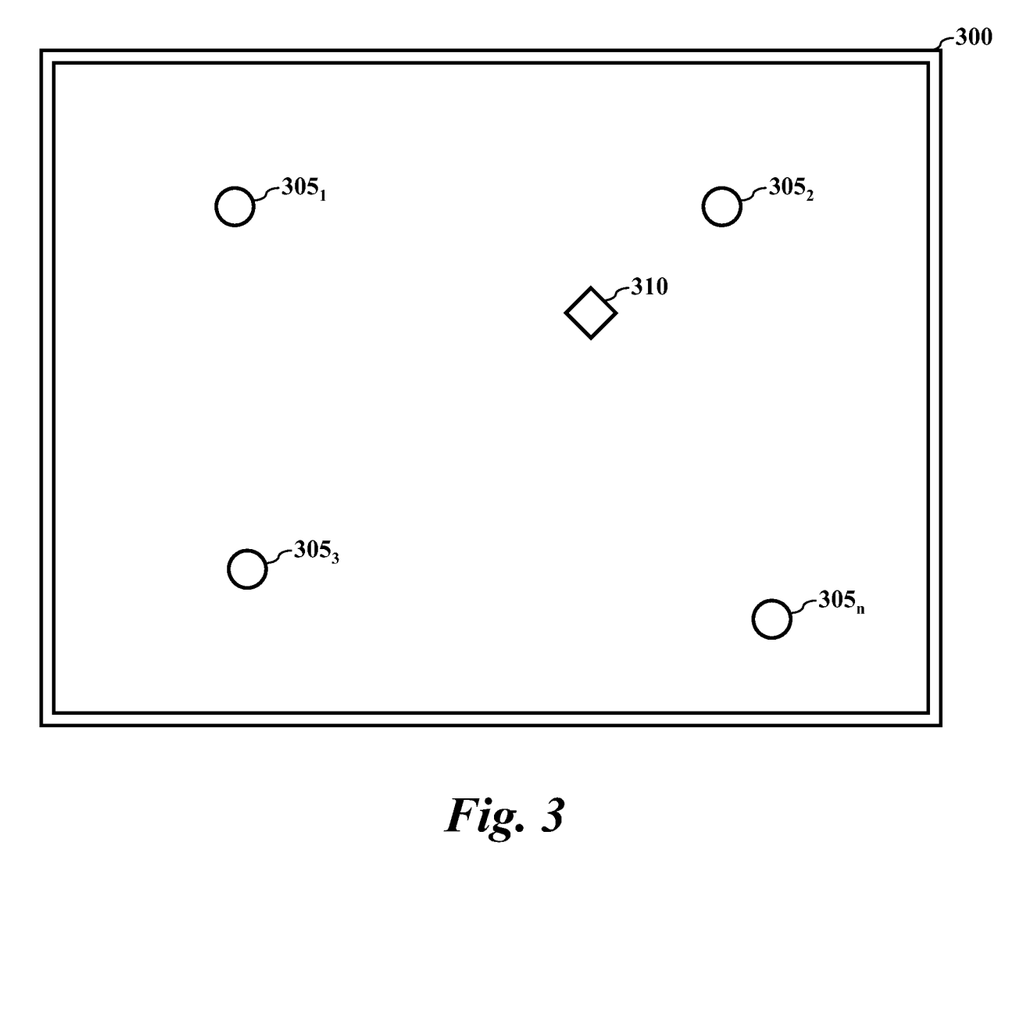
FIG. 3 depicts a graphical representation of a rover and mountpoints according to one embodiment of the invention.

Referring now to FIG. 3, a graphical representation is shown of a geographic area having a plurality of mountpoints $305_{1-n}$ (e.g., mountpoints 105). In one embodiment, server (e.g., server 125) may determine mountpoints $305_{1-n}$ based on a location of mobile device 310 (e.g., mobile device 105) and/or an identifier, such as a company name. As shown in FIG. 3, mobile device 310 may be positioned in geographic area 300 having a plurality of mountpoints $305_{1-n}$. According to one embodiment of the invention, mobile device 310 may communicate with a server (e.g., server 125) (not shown) such that position correction data obtained from one or more of the mountpoints $305_{1-n}$ may be received. In another embodiment, correction data may be received by mobile device 310 by registering/logging in with the server. Further, position correction data may be automatically provided to mobile device 310 by the server. According to another embodiment, the server may be employed for throttling of data provided by the mountpoints $305_{1-n}$ to the server as will be described below in more detail with respect to FIG. 7. Further, mobile device 300 may receive correction data from a server without requiring a user to select the mountpoints $305_{1-n}$ or configure the mobile device processor based on the available mountpoints. In one embodiment, available mountpoints may be accessed by a website or network address provided by a server (e.g., server 125). According to another embodiment, the server may be configured to automatically stream position correction data to mobile device 310.

According to another embodiment, the graphical representation may relate to a display of mobile device 310 to indicate mountpoints in the vicinity of mobile device 310.

Figure 4:
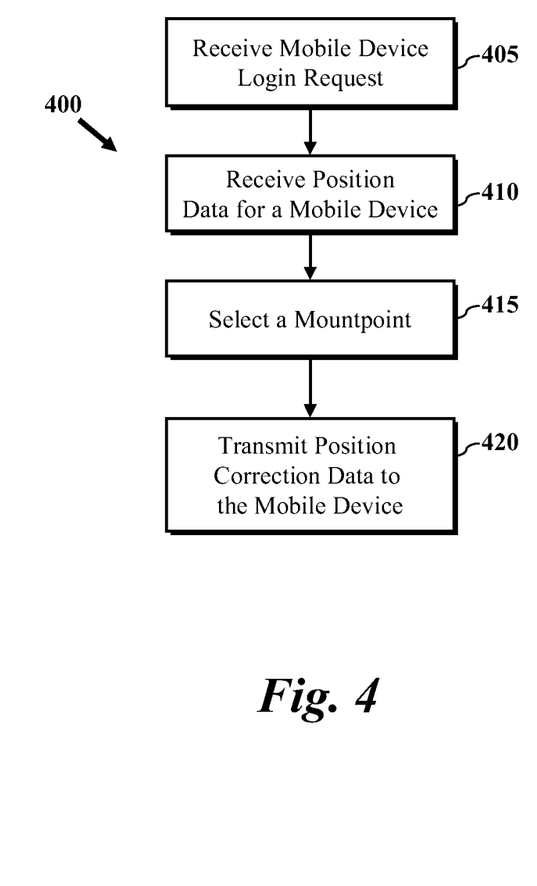
FIG. 4 depicts a process according to one or more embodiments of the invention.

Referring now to FIG. 4, process 400 is shown according to one or more embodiments of the invention. Process 400 may be initiated by a server (e.g., server 125) receiving a request for a mobile device (e.g., mobile device 105) over a data communications network, the request including a user identification at block 405. In one embodiment, the request may be executed by logging-in to the server at a network address of a data communications network. The server can receive the geographic position of the mobile device at block 410. Location data for the mobile device may be transmitted by the device at log-in. At block 415, the server can select a mountpoint based on user identification data provided by the user and/or the geographic location of the mobile device. In one embodiment, the server may retrieve correction data stored for a mountpoint within a distance of the mobile device. The server may then transmit the position correction data to the mobile device over the data communications network at block 420. According to another embodiment, process 400 may further include determining correction data by the server based on data received by the mountpoint select at block 415.

Figure 5:
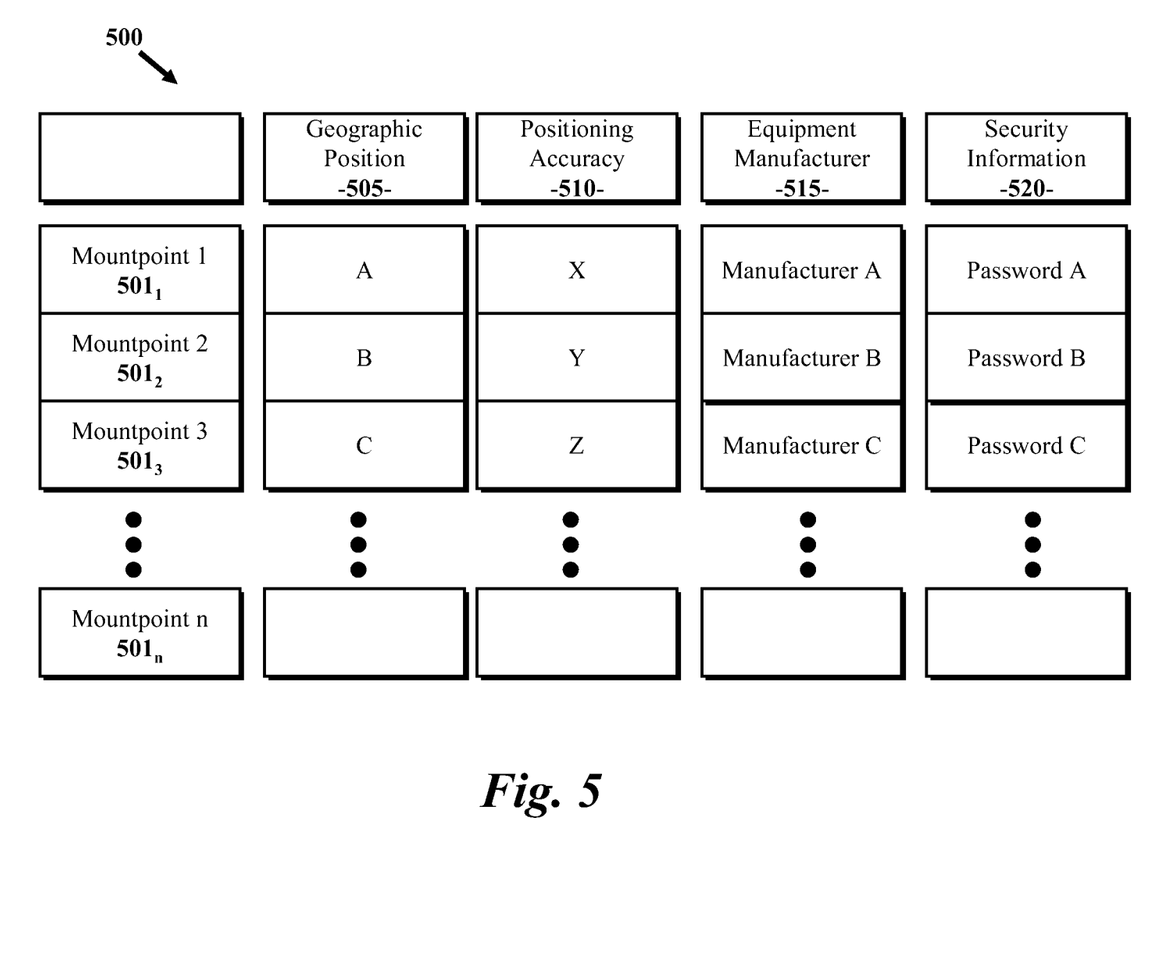
FIG. 5 depicts a graphical representation of mountpoint characteristics according to one or more embodiments of the invention.

Referring now to FIG. 5, a graphical representation is shown of data which may be utilized by a server (e.g., server 125) according to one or more embodiments of the invention. Table 500 illustrates one or more attributes which may be employed by the server to provide position correction data to one or more mobile devices (e.g., mobile device 110). Based on one or more attributes of a mobile device, position correction data may be provided to the mobile device by a server over a data communications network. In one embodiment, the mountpoints may be configured to register with the server. Further, registration may be at start up of the mountpoint, such that attributes of the mountpoint may be transmitted to the server. As shown in table 500, one or more of identifiers $501_{1-n}$, geographic position 505, positioning accuracy 510, and equipment manufacturer 515 data may be stored for each mountpoint. Attributes of may be utilized by a server (e.g., server 125) to provide correction data to one or more mobile devices (e.g., mobile device 110). The server may include security information 520 such a password or unique identifier which may be used to grant access to a mobile device. Security information 520 may supplied to the server by a mountpoint.

Figure 6:
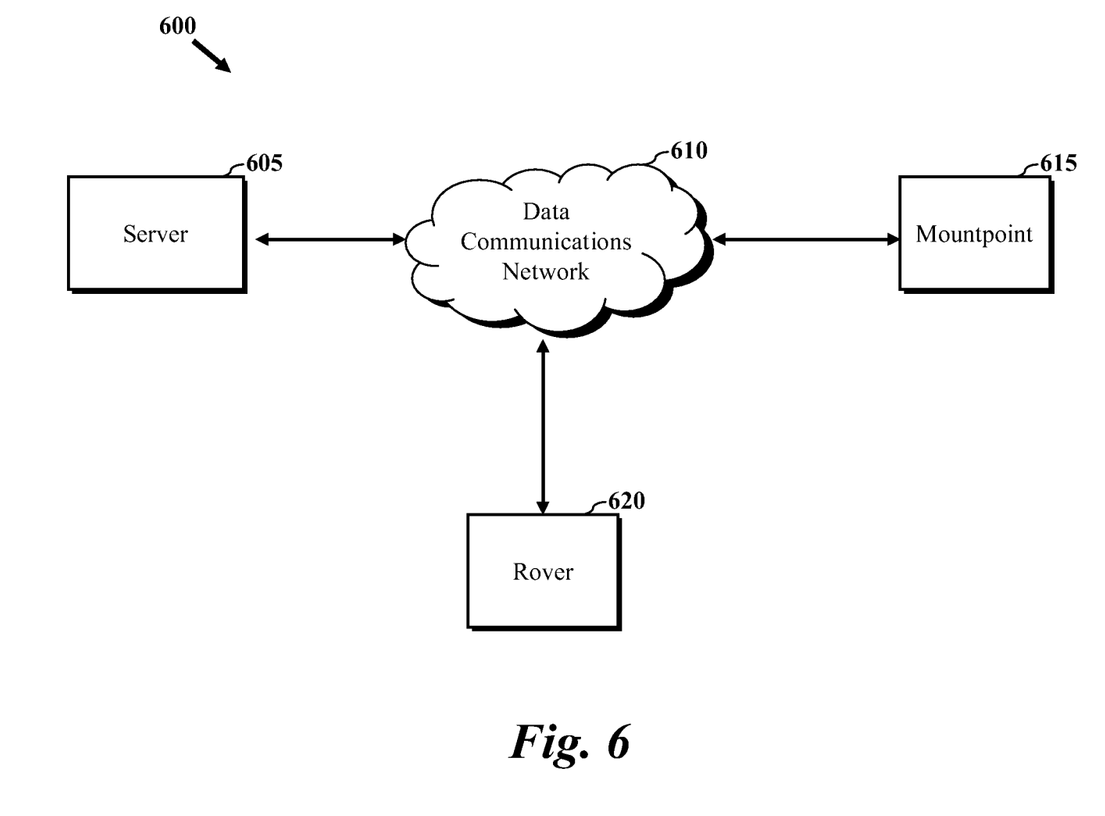
FIG. 6 depicts a simplified block diagram of a system providing mountpoint setup according to one embodiment of the invention.

Referring now to FIG. 6, a simplified block diagram of a system for providing mountpoint setup is shown according to one embodiment of the invention. System 600 may be configured to provide correction data to one or more rovers from one or more base stations. System 600 may relate to another embodiment of the system of FIG. 1. According to one embodiment of the invention, mountpoint setup may be automated by system 600. As shown in FIG. 6, system 600 includes server 605 (e.g., server 125), data communications network 610 (e.g., data communications network 120) and mountpoint 615 (e.g., mountpoint 115). Server 605 may be coupled to a data communications network 610, such as the internet, to interface with one or more mountpoints, such as mountpoint 615, and one or more rovers, such as rover 620.

Once coupled to the data communications network 610, server 605 does not require user configuration to provide mountpoint data to rover 620, according to another embodiment.

Mountpoint 615 may be configured to receive global positioning data and provide correction data to server 605. According to one embodiment of the invention, setup of base station 615 by a user can include a providing a name for a data stream (i.e., mountpoint correction data), an identifier (e.g., company name), and a password that rovers may be provided with. Mountpoint 615 may also transmit a serial number to server 605. One advantage of the invention may be that information, such as the identifier and mountpoint name, may be established by the user setting up mountpoint 615. In that fashion, the need to administer passwords and identifiers on the server may be removed.

Server 605 may be configured to register mountpoint 615 based on the serial number provided. Rover 620 may access correction data from mountpoint 615 by providing an identifier and/or password to server 605 via data communications network 610. Based on the identifier and/or password provided, server 605 can provide rover 620 with a list of all mountpoints that correspond to the identifier and/or password provided. Further, a user of rover 620 can select which mountpoint, such as mountpoint 615, to receive correction data. According to another embodiment, the list of mountpoints provided to rover 620 by server 605 may be based on a location of rover 620.

System 600 may be employed to facilitate identification and incorporation of mountpoint data by rover 620. It may also be advantageous that a company or entity may establish a network of mountpoints and alleviate the need for a user to select and configure their devices, such as rover 620, to utilize correction data.

Figure 7:
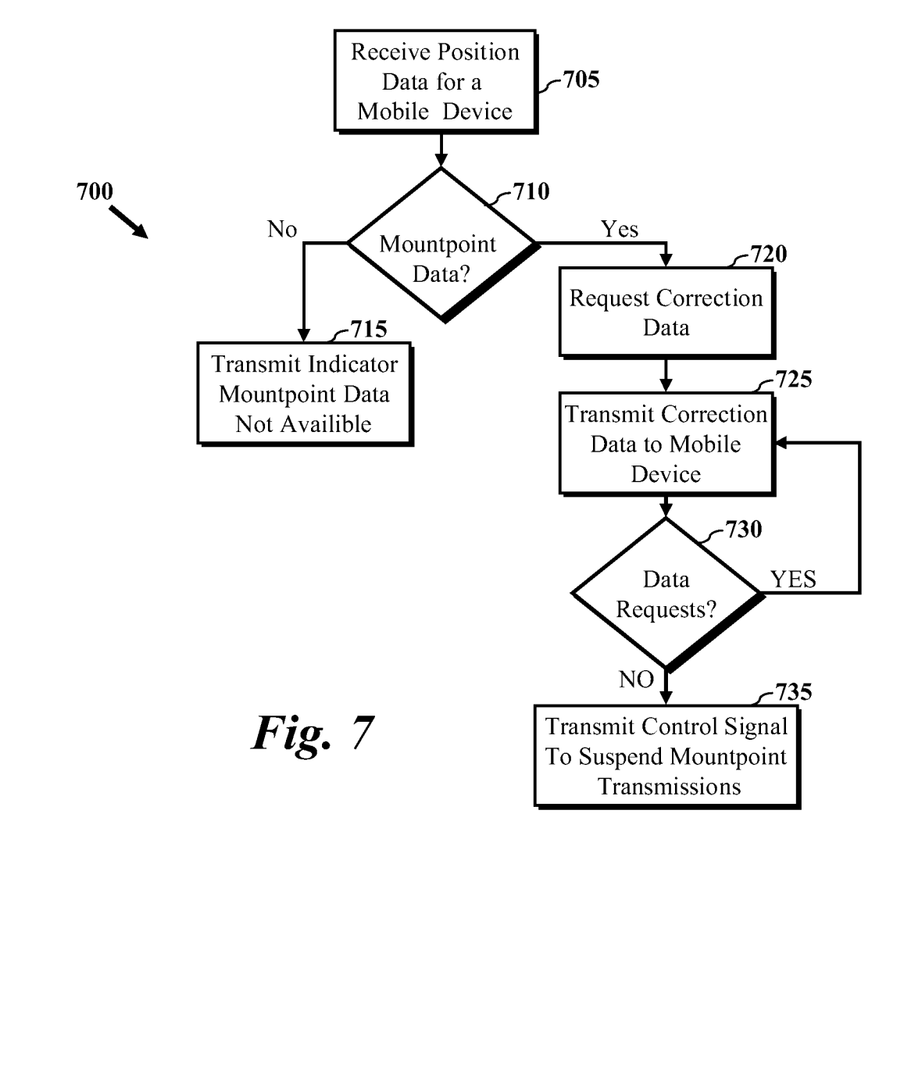
FIG. 7 depicts a process for data throttling according to one or more embodiments of the invention.

Referring now to FIG. 7, process 700 is shown for data throttling, controlling transmission of data for position correction of mountpoint, by a server according to one or more embodiments of the invention. Process 700 may be initiated by a server (e.g., server 125) detecting a position of a mobile device (e.g., mobile device 105) mountpoint at block 705. At block 710, the server can determine if there are any mountpoints (e.g., mountpoints 110) in the geographic area of the mobile device. When the server determines that correction data is not available (e.g., "No" path out of block 710), the server may transmit one or more control signals to indicate that mountpoint data is not available at block 715. When the server determines that correction data is available (e.g., "Yes" path out of block 710), the server can request position correction data from one or more mountpoints at block 720. At block 725, the server can transmit correction data to a mobile device. In one embodiment, the server can transmit correction data previously received from a mountpoint in the geographic area of the mobile device. According to another embodiment, the server may be configured to send correction data to a mobile device in near real-time at block 725.

At block 730, the server can determine if position correction data required from a mountpoint. For example, the server may determine that mountpoint data is not required as no mobile devices are currently registered and/or operational in the geographic region. When position correction is still required (e.g., "YES" path out of block 730), the server can continue to transmit position correction data as required at block 725. However, when correction data is not required (e.g., "NO" path out of block 730) the server may transmit a control signal to suspend transmissions of correction data by the mountpoints at block 735. In one embodiment, mountpoints may be configured to freeze all transmissions of correction data until activated by a server. According to another embodiment, mountpoints may be configured for periodic transmission of correction data regardless of control signals received from the server.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for providing position correction data over a data communications network, the method comprising:
   receiving, by a server, at least one of an identifier or a password from a mountpoint, the mountpoint configured to receive positioning data from a position data source and to determine the position correction data based on the positioning data and a known location of the mountpoint;
   receiving, by the server, a request for the position correction data from a mobile device, the request including at least one of the identifier or the password from the mountpoint, the request transmitted over the data communications network to the server;
   receiving, by the server, a geographic location of the mobile device;
   selecting, by the server, the mountpoint based, at least in part, on at least one of the identifier or the password and the geographic location of the mobile device;
   requesting, by the server, the position correction data from the mountpoint, the position correction data transmitted over the data communications network to the server;
   receiving, by the server, the position correction data associated with the mountpoint; and
   transmitting, by the server, the position correction data to the mobile device over the data communications network.

2. The method of claim 1, wherein the request is received by a network interface having a network communication address.

3. The method of claim 1, wherein the geographic location comprises at least one of global navigation satellite system (GNSS) data, global positioning system (GPS) data and geo-spatial positioning data in general.

4. The method of claim 1, wherein the data communications network corresponds to one or more of cellular network, internet protocol (IP) network and wireless data communications network.

5. The method of claim 1, further comprising transmitting a control signal to the mountpoint to establish periodic transmission of the position correction data to the server from the mountpoint.

6. The method of claim 1, further comprising:
   determining that transmission of the position correction data is not needed, temporarily at least, from the mountpoint; and
   transmitting a control signal to the mountpoint to suspend transmission of the position correction data to the server.

7. A system comprising:
   a mobile device;
   a mountpoint configured to receive positioning data from a position data source and to determine position correction data based on the positioning data and a known location of the mountpoint; and
   a server in communication with the mobile device and the mountpoint over a data communications network, the server configured to:
      receive at least one of an identifier or a password from the mountpoint;
      receive a request for the position correction data from the mobile device, the request including at least one of the identifier or the password from the mountpoint;
      receive a geographic location of the mobile device;
      select the mountpoint based, at least in part, on at least one of the identifier or the password and the geographic location of the mobile device;
      request the position correction data from the mountpoint;
      receive the position correction data associated with the mountpoint; and
      transmit the position correction data to the mobile device.

8. The system of claim 7, wherein the geographic location comprises at least one of global navigation satellite system (GNSS) data, global positioning system (GPS) data and geo-spatial positioning data in general.

9. The system of claim 7, wherein the data communications network corresponds to one or more of cellular network, internet protocol (IP) network and wireless data communications network.

10. The system of claim 7, the server further configured to transmit a control signal to the mountpoint to establish periodic transmission of the position correction data to the server from the mountpoint.

11. The system of claim 7, the server further configured to:
   determine that transmission of the position correction data is not needed, temporarily at least, from the mountpoint; and
   transmit a control signal to the mountpoint to suspend transmission of the position correction data to the server.

12. A computer program product comprising:
   a non-transitory computer readable medium having computer executable program code embodied therein to provide position correction data over a data communications network, the computer executable program product having;
   computer executable program code to receive, by a server, at least one of an identifier or a password from a mountpoint;
   computer executable program code to receive, by the server, a request for the position correction data from a mobile device, the request including at least one of the identifier or the password from the mountpoint, the request transmitted over the data communications network to the server;
   computer executable program code to receive, by the server, a geographic location of the mobile device;
   computer executable program code to select, by the server, the mountpoint based, at least in part, on at least one of the identifier or the password and the geographic location of the mobile device;
   computer executable program code to request, by the server, the position correction data from the mountpoint, the position correction data transmitted over the data communications network to the server;

computer executable program code to receive, by the server, the position correction data associated with the mountpoint; and computer executable program code to transmit, by the server, the position correction data to the mobile device over the data communications network.

13. The computer program product of claim 12, wherein the request is received by a network communication address associated with the server.

14. The computer program product of claim 12, wherein the geographic location comprises at least one of global navigation satellite system (GNSS) data, global positioning system (GPS) data and geo-spatial positioning data in general.

15. The computer program product of claim 12, wherein the data communications network corresponds to one or more of cellular network, internet protocol (IP) network and wireless data communications network.

16. The computer program product of claim 12, further comprising computer executable program code to transmit a control signal to the mountpoint to establish periodic transmission of the position correction data to the server from the mountpoint.

17. The computer program product of claim 12, further comprising computer executable program code to:

determine that transmission of the position correction data is not needed, temporarily at least, from the mountpoint; and transmit a control signal to the mountpoint to suspend transmission of the position correction data to the server.

18. The method of claim 1, further comprising receiving, by the server, geographic position information, positioning accuracy information, equipment manufacturer information, and security information from the mountpoint.

19. The system of claim 7, wherein is further configured to receive geographic position information, positioning accuracy information, equipment manufacturer information, and security information from the mountpoint.

* * * * *